United States Patent [19]

Clarke

[11] 4,176,560
[45] Dec. 4, 1979

[54] VARIABLE SPEED DRIVE

[76] Inventor: George C. Clarke, 10509 Penfield Ave., Chatsworth, Calif. 91311

[21] Appl. No.: 791,226

[22] Filed: Apr. 27, 1977

[51] Int. Cl.² .................... F16H 55/56; F16H 55/36
[52] U.S. Cl. .................... 74/230.17 A; 74/230.17 D; 56/11.1; 180/75
[58] Field of Search ............... 74/230.17 D, 230.17 A, 74/230.17 R, 242.8, 242.9, 242.12, 242.15 R; 56/11.1, 11.8, DIG. 22; 180/70 R, 75, 72

[56] References Cited

U.S. PATENT DOCUMENTS

| 2,510,325 | 6/1950 | Anderson | 180/70 R |
|---|---|---|---|
| 3,470,757 | 10/1969 | Miley | 74/230.17 D |
| 3,477,439 | 11/1969 | Hamouz et al. | 180/70 R |
| 3,494,210 | 2/1970 | Ashton et al. | 74/230.17 |
| 3,515,010 | 6/1970 | Wagstaff et al. | 74/242.15 R |
| 3,583,535 | 6/1971 | Plamper | 180/70 R |
| 3,759,342 | 9/1973 | Plamper | 74/230.17 D |
| 3,777,585 | 12/1973 | Plamper | 74/230.17 D |
| 3,903,679 | 9/1975 | Sorenson et al. | 56/11.8 |
| 4,058,957 | 11/1977 | Roseberry | 56/11.8 |
| 4,128,017 | 12/1978 | Clarke | 74/230.17 D |
| 4,132,121 | 1/1979 | Clarke | 74/230.17 A |

FOREIGN PATENT DOCUMENTS 1426878  3/1976  United Kingdom ............. 74/242.15 R Primary Examiner—Samuel Scott
Assistant Examiner—William R. Henderson
Attorney, Agent, or Firm—Jenkins, Coffey, Hyland, Badger & Conard

[57] ABSTRACT

A variable speed drive for a riding lawn mower or the like has a double pulley variable speed sheave assembly coupled between a driving pulley and a driven pulley by first and second V-belts, respectively. The sheave assembly is carried at one end of a bell crank which is centrally pivoted to one end of a pivot arm. The pivot arm is pivotally connected to the vehicle frame and is biased to urge the sheave assembly toward an operating position with the belts under driving tension. A mechanical control linkage is connected to the other end of the bell crank, and is operable to shift the sheave assembly with respect to the driving and driven pulley to alter the sheave assembly drive ratio in a manner such that belt tension varies with variations in operating speed. The control linkage is operable to move the sheave assembly between a stopped position with both belts declutched and a range of low to high speed operating positions, and is springably biased to urge the sheave assembly toward said stopped position.

23 Claims, 9 Drawing Figures

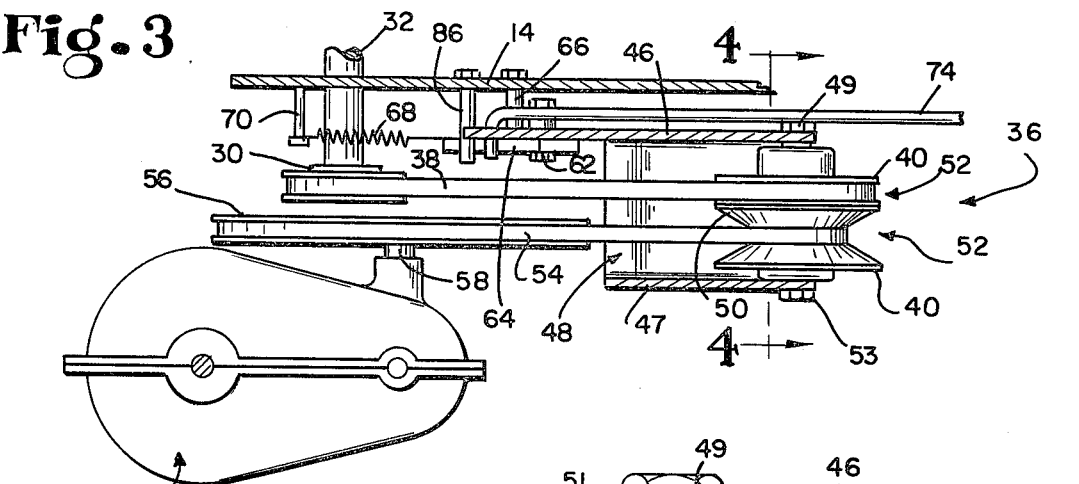
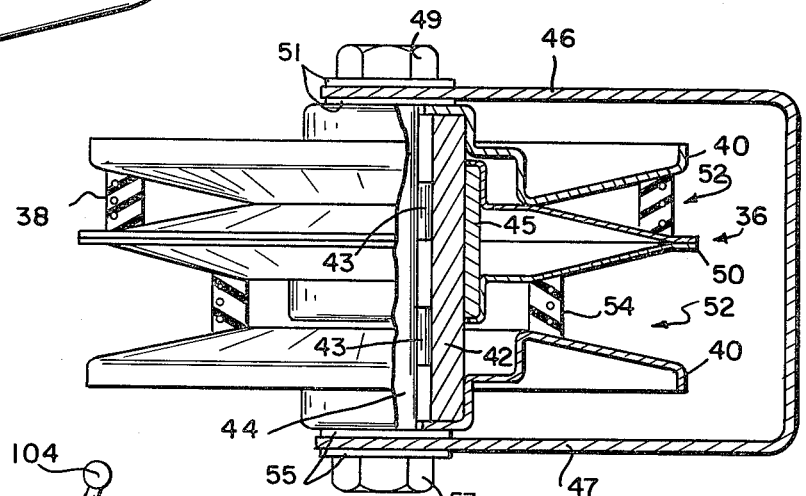
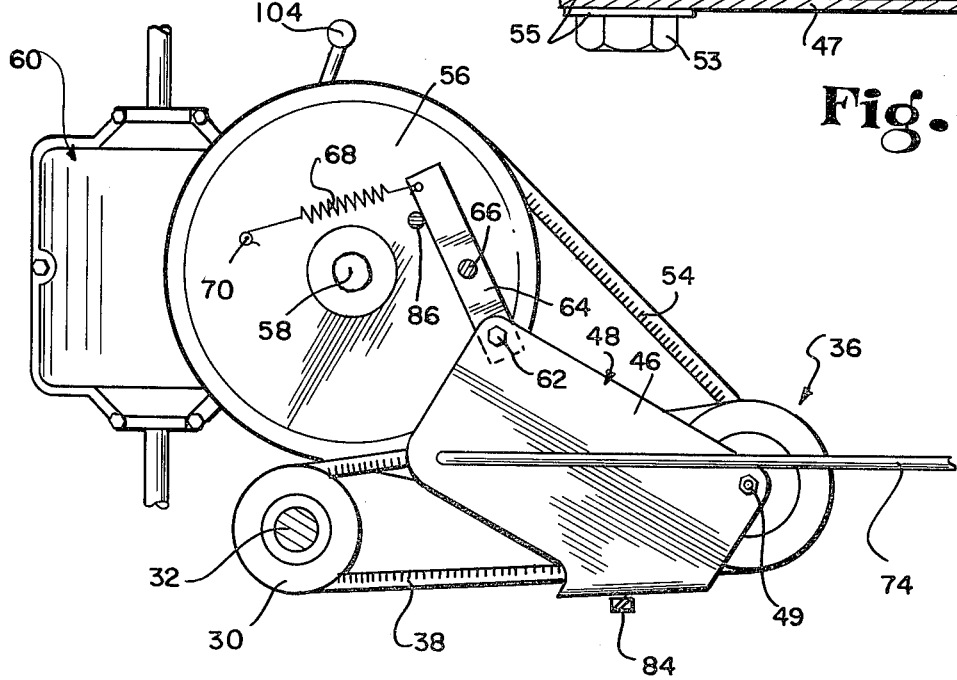

VARIABLE SPEED DRIVE

BACKGROUND OF THE INVENTION

This application is related in subject matter to my concurrently filed applications Ser. No. 791,373, filed Apr. 27, 1977, now U.S. Pat. No. 4,128,017, and Ser. No. 791,227, filed Apr. 27, 1977, now U.S. Pat. No. 4,132,121.

This invention relates to variable speed drives. More specifically, the invention relates to a variable speed drive system for use in small riding vehicles such as riding lawn mowers, garden tractors, and the like.

A wide variety of variable speed drives for small self-propelled vehicles are available throughout the prior art. Typically, such systems comprise a small driving motor such as a gasoline engine for rotating a driving pulley. The driving pulley is coupled by a V-belt to a driven pulley which imparts rotational motion to variable speed means such as a set of gears. In operation, the vehicle operator adjusts the gears to select a desired rate and direction of travel, and then drivingly engages the V-belt with the pulleys to drive the vehicle. See, for example, U.S. Pat. Nos. 3,789,684; 3,311,186; and 3,575,252.

Variable speed gear assemblies for use in riding lawn mowers and other small riding vehicles have not been totally satisfactory because of their relatively high cost. Further, conventional gear assemblies do not provide continuous speed variation over a wide range of low to high speeds without shifting gears. Morover, gear drive systems have typically utilized a single V-belt which is subjected to large starting forces upon initial engagement with the pulleys. These large starting forces often cause the vehicle to dangerously buck and jerk. The existence of large starting forces also significantly shortens the operational life of the V-belt, and requires frequent belt replacement.

Some variable speed drives have been proposed using a double pulley variable speed sheave for obtaining wide range speed variation. See, for example, U.S. Pat. Nos. 3,015,237; 3,457,797; 3,470,757; and 3,583,535. The variable speed sheave is mounted between a driving pulley and a driven pulley, with a second V-belt coupling the sheave with the driven pulley. The driven pulley in turn imparts rotational motion to the vehicle wheels via chains and sprocket wheels or the like. Speed variation is obtained by shifting the variable speed sheave with respect to the other pulleys to alter the sheave drive ratio. However, in such prior art systems, it is common practice to maintain one of the V-belts under driving tension at all times and to selectively engage and disengage the other V-belt for starting and stopping of the system. Thus, upon initial motion of the vehicle, one belt is required to absorb large starting forces. Accordingly, the dangerous bucking and jerking starts inherent with single belt drive systems have not been satisfactorily eliminated.

In recent years, safety has become an increasingly important criteria in the design of riding lawn mowers and the like. Accordingly, it is highly desirable to have drive assemblies such as gears, sprocket wheels, chains, etc. inaccessibly housed for safe vehicle operation. In this regard, prior art variable speed gear assemblies are advantageous in that they are typically enclosed within a gear box. On the other hand, chains and sprocket wheels used with variable speed sheaves are often mounted in an accessible location on the underside of the vehicle. See also U.S. Pat. Nos. 3,777,585 and 3,759,342. These exposed chain drives are inherently dangerous, and are frequently involved in severe consumer accidents.

It has also become desirable for riding lawn mowers and other small riding vehicles to include a so-called dead man control for automatically and immediately disabling the vehicle drive system in the event the operator falls off the vehicle or otherwise becomes unable to properly operate the vehicle. Generally, however, prior art riding vehicles have failed to utilize such dead man controls. Instead, prior art vehicles have used conventional clutch mechanisms which are normally biased for maintaining the drive system in an engaged, operating condition. Such clutch mechanisms require positive operator action to disable the drive system, and thereby cause the vehicle to continue operation in the event the operator falls off the vehicle.

Maintenance has also become an increasingly important aspect in the design of small vehicles such as riding lawn mowers. In particular, it is well known that V-belts used in belt drive systems tend to stretch during use. Eventually, the belts stretch to an extent whereby they no longer drivingly engage their respective pulleys. To this end, it is common practice to utilize springably biased pulley-carrying arms or springably biased idler pulleys for maintaining belts under driving tension. See, for example, U.S. Pat. Nos. 3,583,535; 3,015,237; 3,457,797; and 3,470,757. These mechanisms serve to maintain relatively constant tension on the belts regardless of belt stretching and regardless of belt velocity during operation. However, for maximum belt operating life, it is also desirable to adjust belt tension in accordance with operating speed while simultaneously adjusting for belt stretching. Specifically, some vehicles such as riding mowers require relatively high belt tension at high horsepower, high speed operating conditions, and relatively low belt tension at low horsepower, low speed operating conditions for optimum belt life. Other types of vehicles such as some recreational vehicles require relatively high belt tension at low speeds, and relatively low belt tension at high speeds. Prior art devices which account for belt stretching have failed to satisfactorily adjust belt tension over a range of operating speeds.

The variable speed drive of this invention provides an integrated drive system for a riding lawn mower or the like which overcomes the many problems and disadvantages of the prior art. Specifically, this invention provides a variable speed sheave assembly and driving belts in a variable speed drive which smoothly starts and drives a vehicle without significant bucking or jerking and which provides speed variations over a continuous wide range. Moreover, this invention provides a variable speed drive which has substantially enclosed and concealed driving elements, which provides an effective dead man control, and which adjusts belt tension in accordance with operating speed.

SUMMARY OF THE INVENTION

In accordance with a preferred embodiment of the invention, a variable speed drive for a riding lawn mower or the like has a double pulley variable speed sheave assembly. The sheave assembly is coupled by a first V-belt to a motor-operated driving pulley and by a second V-belt to a driven pulley. The sheave assembly is carried out one end of a bell crank housing which is centrally pivoted to one end of a pivot arm which, in turn, is pivotally connected to the frame of the vehicle. A first spring biases the pivot arm to urge the bell crank housing generally away from the driving and driven pulleys to thereby urge the sheave assembly toward an operating position with both V-belts under driving tension. A mechanical control linkage is connected to the other end of the bell crank housing, and is operable to shift the position of the sheave assembly with respect to the driving and driven pulleys to alter the sheave assembly drive ratio. Importantly, the control linkage is operable to move the sheave assembly between a stopped position with both belts drivingly disengaged and a range of low to high speed operating positions with both belts drivingly engaged. A second spring is connected to the control linkage for continuously urging the sheave assembly toward the stopped position whenever pressure on the control linkage is released by the vehicle operator.

The bell crank housing and the pivot arm are configured such that the tension on the V-belts increases with increases in operating speed. More specifically, when the sheave assembly is in a low speed operating position, the first spring is minimally stretched so that the force applied to the pivot arm by the first spring is at a minimum. Thus, at low operating speed, the tensioning force applied to the V-belts is at a minimum so that the belts operate under a relatively low tension condition which corresponds with design criteria for optimum belt life. As driving speed increases, the first spring is progressively stretched so that force applied by the first spring increases. Correspondingly, this causes belt tension forces to increase. Thus, as operating speed increases, the V-belts operate under a relatively higher tension condition.

The driven pulley is coupled to a transaxle assembly carried in a closed housing. The driven pulley drives in opposite directions a pair of bevel gears within the housing. One of said bevel gears is selectively coupled by the vehicle operator to a differential assembly which in turn is coupled to the wheels of the vehicle for selective driving of the vehicle in either a forward or a reverse direction.

BRIEF DESCRIPTION OF THE DRAWINGS

The accompanying drawings illustrate the invention. In such drawings:

FIG. 3 is an enlarged fragmented vertical section taken on the line 3—3 of FIG. 2;

FIG. 4 is an enlarged fragmented vertical section taken on the line 4—4 of FIG. 3;

FIG. 5 is a fragmented top plan view showing the variable speed drive in a stopped position;

DETAILED DESCRIPTION OF THE PREFERRED EMBODIMENT

Figure 1:
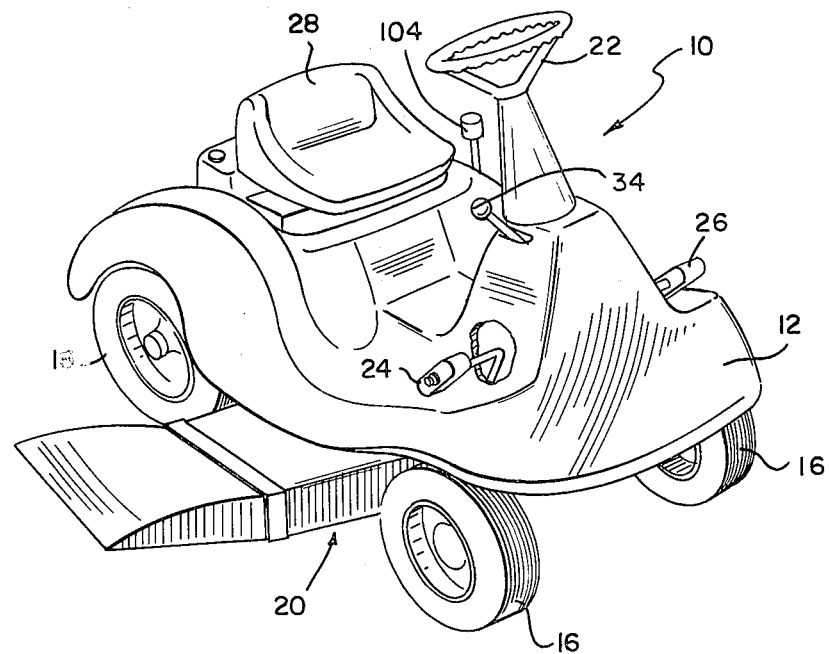
FIG. 1 is a perspective view of a riding lawn mower having a variable speed drive of this invention.

A riding lawn mower 10 is shown in FIG. 1, and generally comprises a molded shell body 12 carried over a vehicle frame (not shown in FIG. 1). The frame supports a pair of front wheels 16 and a pair of rear wheels 18, and a lawn mowing assembly 20 is carried on the frame near the ground generally between the front and rear wheels. Directional control for the vehicle is provided by a steering wheel 22 coupled to the front wheels 16 by a conventional steering linkage (not shown). An accelerator pedal 24 for controlling vehicle speed is provided on one side of the steering wheel 22, and a brake pedal 26 is provided on the other side. Both pedals 24 and 26 are controllable by an operator for whom a seat 28 is provided generally over the rear wheels 18. The variable speed drive of this invention together with a driving motor (not shown) such as a small gasoline engine are enclosed within the shell body 12 generally under the seat 28. Importantly, while a riding mower is shown in FIG. 1, it should be understood that the variable speed drive of this invention is equally applicable with garden tractors and other small self-propelled vehicles and equipment requiring power transmission over a continuous range of speeds.

The variable speed drive of this invention is shown in detail in FIGS. 2-7. As shown, a driving pulley 30 is mounted for horizontal rotation on the lower end of a vertically extending shaft 32. The shaft 32 extends through the vehicle frame 14, and has its upper end connected to and driven by the driving motor (not shown). The shaft 32 and the driving pulley 30 are thus rotatable by the motor at a rate of speed in accordance with motor speed. Conveniently, motor speed is variable by means of a hand-operated throttle 34 shown adjacent the steering wheel in FIG. 1.

The driving pulley 30 is coupled to a double pulley, variable speed sheave assembly 36 by a driving belt 38. The driving belt 38 comprises a rubberized continuous V-belt of generally conventional construction, and is reeved about the driving pulley 30 and the sheave assembly 36. The sheave assembly 36 comprises a pair of outer pulley halves 40 fixed in opposed relation on a vertical sleeve 42. The sleeve 42 is rotatably carried by bearings 43 on a vertically extending sheave shaft 44. A central pulley section 50 is carried on a hub 45 which slides axially along the sleeve 42. Thus, the central pulley section 50 combines with the outer pulley halves 40 to form a pair of vertically spaced pulley grooves 52. The driving belt 38 is received in the upper one of these pulley grooves 52 so that rotational motion of the driving pulley 30 is imparted to the sheave assembly 36.

A drive V-belt 54 is reeved about the lower pulley groove 52 of the variable speed sheave assembly 36. This driven belt 54 also comprises a conventional-type continuous belt of rubberized construction, and is reeved about a relatively large driven pulley 56 to couple said pulley 56 to the sheave assembly 36. The drive pulley 56 is horizontally retained on a vertical shaft 58 which imparts rotation of the driven pulley 56 through a transaxle assembly 60 and further to the rear wheels 18 of the vehicle. Thus, rotation of the driving pulley 30 is transmitted through the variable speed sheave assembly 36, the driven pulley 56, and the transaxle assembly 60 to drive the rear wheels 18. Importantly, because the central pulley section 50 slides between the outer pulley halves 40, the two pulley grooves 52 of the sheave assembly 36 have inversely proportional effective diameters. As the central section 50 moves away from the upper and outer pulley half 40, the effective diameter of the belt-receiving upper groove 52 decreases to thereby increase the effective diameter of the lower groove 52, and vice versa upon upward motion of the central section 50, to control the sheave assembly drive ratio.

The sheave assembly 36 is mounted on a bell crank housing 48 which supports the sheave assembly with respect to the driving and driven pulleys 30 and 56. The bell crank housing 48 comprises an upper plate 46 and a lower plate 47. The upper end of the sheave shaft 44 is connected to the upper plate 46 near the forwardmost end of the plate by a bolt 49 and washers 51. The upper plate 46 extends laterally outwardly from the bolt 49, and then turns downwardly for integral connection to the lower plate 47. The lower plate 47 extends transversely below the sheave assembly 36 and is connected to the lower end of the sheave shaft 44 by a bolt 53 and washers 55. In this manner, the sheave assembly 36 is carried by the bell crank housing 48 at one end of a mechanical bell crank link to be hereafter described in more detail.

The bell crank housing 48 is pivotally connected by a bolt 62 near its rear end behind the sheave assembly to one end of a pivot arm 64. The pivot arm 64 is in turn centrally connected by a vertically extending pin 66 to the vehicle frame 14. The pin 66 is rotatably connected to the frame to allow horizontal rotation of the pivot arm 64 about the pin 66. A spring 68 is connected between the opposite end of the pivot arm 64 and a pin 70 mounted on the frame. The spring 68 is tension-loaded to bias the pivot arm for counterclockwise rotation as viewed in FIG. 5. In this manner, the pivot arm 64 is biased to throw the bell crank housing 48 and the sheave assembly 36 generally forwardly away from the axes of the driving and driven pulleys 30 and 56 to urge the V-belts 38 and 54 toward an operating position under driving tension. Importantly, the double linkage comprising the pivot arm 64 between the pin 66 and the connecting bolt 62, and the bell crank housing 48 between the bolt 62 and the axis of the sheave assembly 36, is configured such that the angular relationship as shown in FIG. 5 between the pivot arm 64 and the leg between 62 and 49 of the bell crank housing 48 does not exceed 180°.

Figure 2:
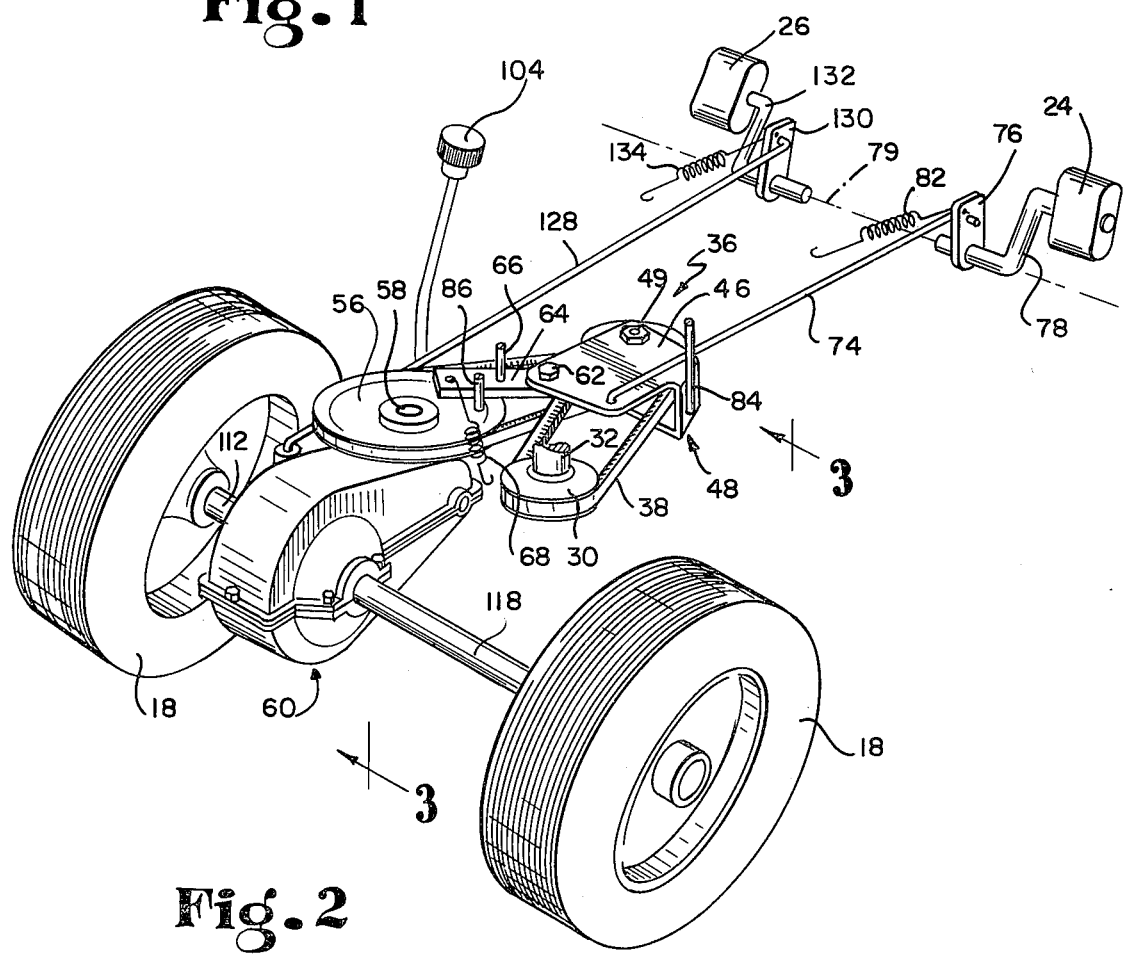
FIG. 2 is a perspective view of the variable speed drive of this invention.

A mechanical control linkage is also connected to the bell crank housing 48 for shifting the position of the sheave assembly with respect to the driving and driven pulleys 30 and 56. The control linkage comprises a link 74 having its rear end pivotally connected to the upper plate 46 of the bell crank housing 48 at a position laterally outwardly of the pivot arm connecting bolt 62. In this manner, the upper plate 46 comprises a mechanical bell crank link with the sheave assembly 36 and the control link 74 being connected to opposite ends of the bell crank, and with the pivot arm 64 being centrally connected to the bell crank. As shown in FIG. 2, the control link 74 extends forwardly from the bell crank housing 48, and has its front end pivotally connected to the upper end of a crank arm 76. The lower end of the crank arm 76 is fixed to the lower end of a rockshaft 78 mounted on the frame in a suitable manner (not shown) for rotation about the axis shown by the dotted line 79 in FIG. 2. The upper, outer end of the rockshaft 78 is connected to the accelerator pedal 24. Accordingly, when the vehicle operator pushes forwardly and downwardly on the accelerator pedal 24, the control link 74 is pulled forwardly to rotate the bell crank housing 48 counterclockwise generally about the connecting bolt 62 to alter the position of the sheave assembly 36 with respect to the driving and driven pulleys 30 and 56. Importantly, the upper end of the crank arm 76 is coupled to the frame (not shown) by a tension-loaded spring 82 which urges the control link 74 rearwardly. In this manner, the accelerator pedal 24, control link 74, bell crank housing 48, and the sheave assembly 36 are always returned to the same initial position whenever pressure on the accelerator pedal is released by the vehicle operator.

Figure 6:
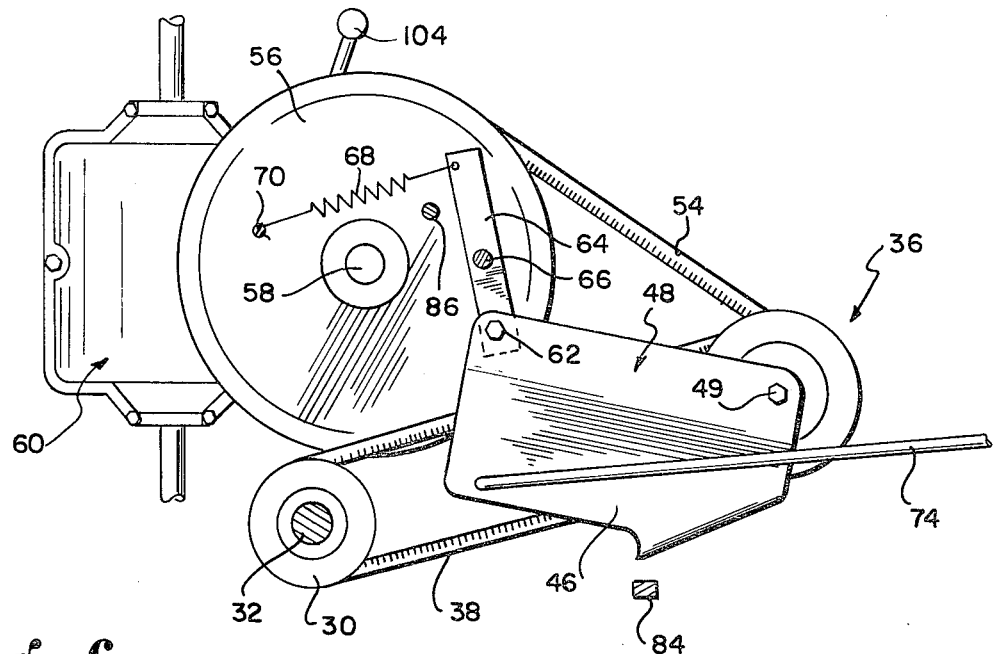
FIG. 6 is a fragmented top plan view showing the drive in a low speed operating position.
Figure 7:
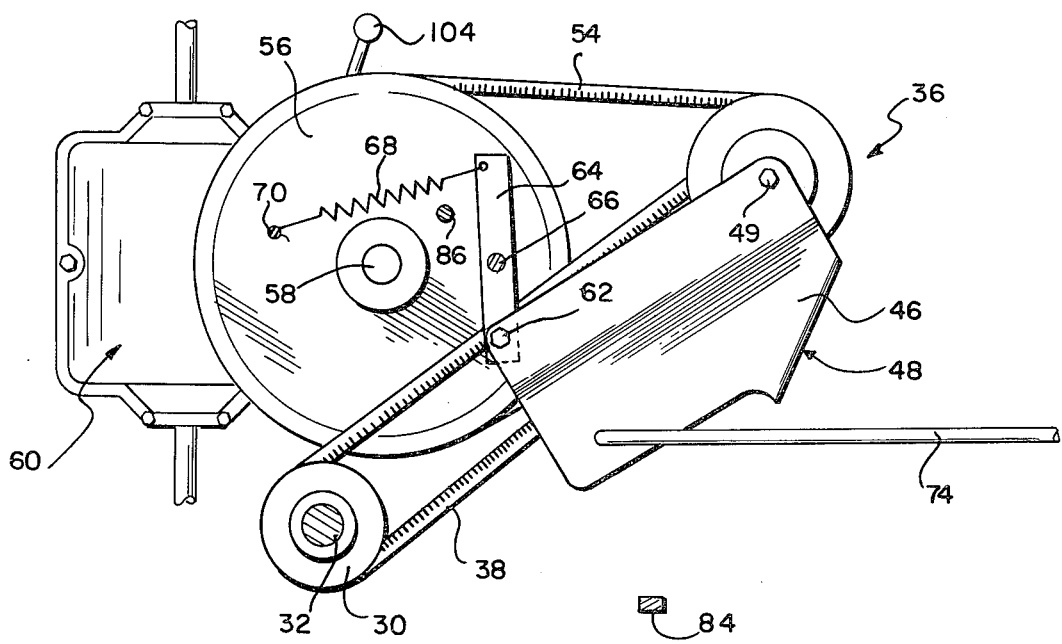
FIG. 7 is a fragmented top plan view showing the drive in a high speed operating position.

Operational of the variable speed drive is shown in FIGS. 5-7. As shown in FIG. 5, when pressure on the accelerator pedal 24 is released, the control link 74 is urged rearwardly by the spring 82. This allows the bell crank housing to pivot generally about the connecting bolt 62 to a stopped position abutting a stop pin 84 depending from the vehicle frame. In this position, the sheave assembly 36 is disposed relatively near the axial centers of the driving and driven pulleys 30 and 56 so that both of the V-belts 38 and 54 are drivingly disengaged from the sheave assembly and their respective pulley. In this position, the variable speed drive is declutched even though the driving pulley 30 is being rotated by the driving motor. Because the V-belts 38 and 54 are not under driving tension, the pivot arm 64 is urged by the spring 68 to rotate counterclockwise as viewed in FIG. 5 to bias the sheave assembly toward an operating position. However, such rotation of the pivot arm 64 causes the arm to abuttingly engage stop pin 86 depending from the vehicle frame to prevent the V-belts from being placed under driving tension.

As the accelerator pedal 24 is depressed by the vehicle operator, the sheave assembly 36 is moved to a low speed operating position as viewed in FIG. 6. More specifically, pressure on the accelerator pedal 24 overcomes the force of the crank link spring 82 and pulls the control link 74 forwardly. This pivots the bell crank housing 48 generally about the connecting bolt 62 to carry the sheave assembly 36 generally away from the axial centers of the driving and driven pulleys 30 and 56. The result is a smooth and substantially simultaneous engagement of the two V-belts 38 and 54 with the sheave assembly and their respective pulley, with the sheave assembly being disposed relatively near the driving pulley 30 and relatively far from the driven pulley 56 to place the sheave assembly in a low speed drive ratio. Tension on the belts causes the pivot arm 64 to rotate clockwise as viewed in FIG. 6 a short distance away from contact with the adjacent stop pin 86 whereby the force applied by the spring 68 on the pivot arm 64 dictates the magnitude of driving tension forces on the V-belts. That applied force equals the multiple of the distance the spring 68 is stretched and the spring constant of the spring 68. Importantly, the double linkage comprising the pivot arm 64 and the bell crank housing 48 between the pivot pin 66 and the sheave assembly allows adjustment of the sheave assembly position to compensate for stretching of the V-belts during use without affecting belt tension for a given operating speed. When pressure on the accelerator pedal 24 is released, the crank arm spring 82 provides a dead man control by urging the entire assembly back to the stopped position of FIG. 5.

As the accelerator pedal is further depressed by the vehicle operator, the sheave assembly 36 is moved toward a high speed operating condition as viewed in FIG. 7. More specifically, the bell crank housing 48 pivots further with respect to the pivot bolt 62. The sheave assembly 36 is thereby carried generally away from the axial center of the driving pulley 30 and generally toward the axial center of the driven pulley 56 to shift the sheave assembly toward a high speed drive ratio with both V-belts drivingly engaged. When pressure on the accelerator pedal 24 is released, the crank arm spring 82 provides a dead man control by urging the entire assembly toward a lower speed operating position and then to the stopped position of FIG. 5.

The connections of the bell crank housing 48 and the pivot arm spring 68 to the pivot arm 64 are chosen such that the force applied to the pivot arm 64 by the spring 68 which governs the magnitude of belt tension forces increases with increases in operating speed. That is, the spring force is a minimum at the low speed operating position. In this manner, the tension of the V-belts 38 and 54 is a minimum at low operating speed for relatively low torque operation. As operating speed increases, the distance which the spring 68 is stretched increases to increase the magnitude of the spring force, and correspondingly increase the magnitude of the belt tension forces. In this manner, as operating speed increases, the tension of the V-belts 38 and 54 increases for progressively higher horsepower operation. This results in belt tension adjustment in accordance with operating speed to match specific design criteria for optimum belt operating life.

Figure 8:
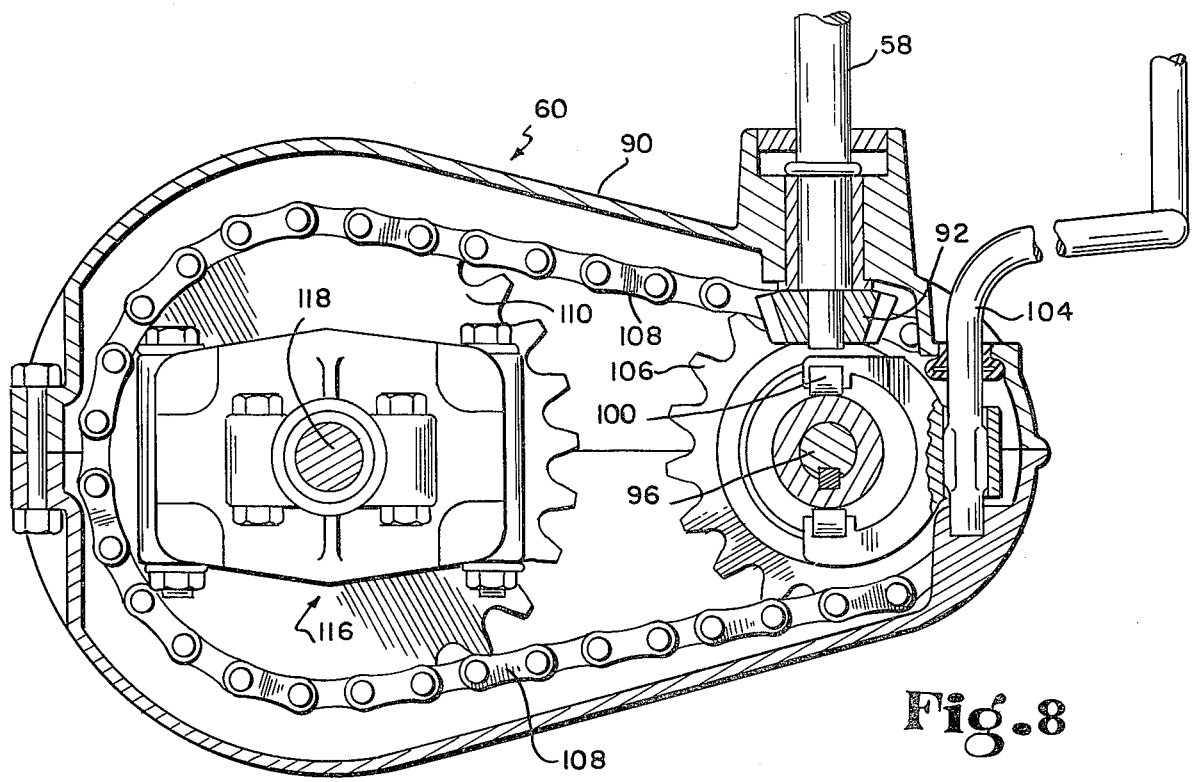
FIG. 8 is an enlarged vertical section of a transaxle assembly for use with the variable speed drive of this invention.
Figure 9:
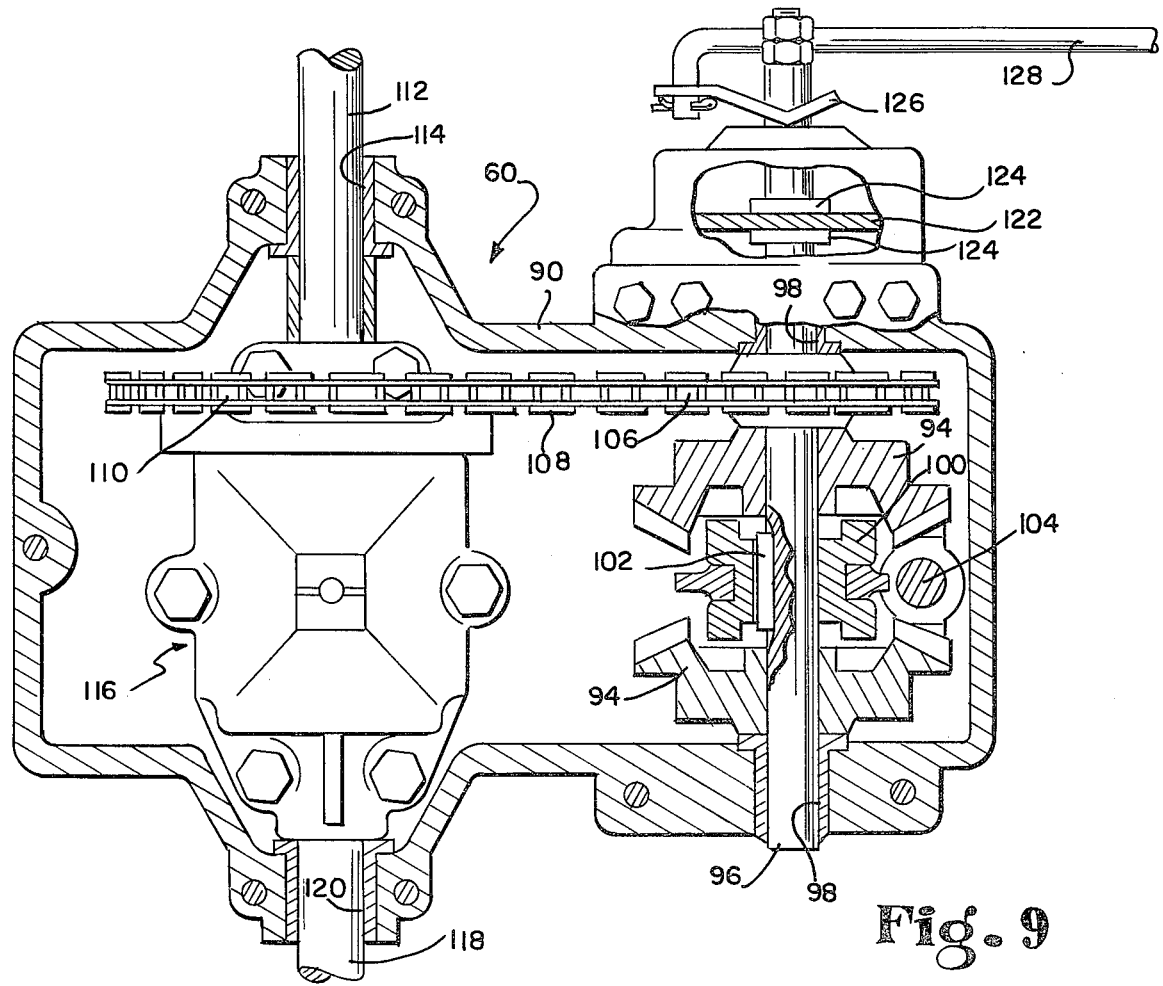
FIG. 9 is a horizontal section of the transaxle assembly of FIG. 8.

The transaxle assembly 60 is shown in detail in FIGS. 8 and 9. As shown, the shaft 58 carrying the driven pulley 56 comprises an input shaft for the transazle assembly, and has its lower end coupled within an enclosed transaxle housing 90 to a horizontally disposed input bevel gear 92. This input bevel gear 92 is in constant mesh with a pair of facing side bevel gears 94 carried on a horizontal shaft 96, and thus drives the gears 94 in opposite rotational directions. The two side bevel gears 94 are freely rotatable on the shaft 96 which in turn rotates within bearings 98 mounted on the transaxle housing 90. A driving dog 100 is carried on the transaxle shaft 96 between the side bevel gears 94. The driving dog 100 is positioned on the shaft 96 by a key 102 for axial sliding movement along the shaft and for rotation with the shaft. The driving dog is moved along the shaft 96 by a shift lever 104 extending upwardly from the transaxle assembly 60 to engage the dog with one of the two side bevel gears 94. In this manner, the transaxle shaft 96 is caused to rotate within its bearings 98 in a selected one of two rotational directions for either forward or reverse transmission of power.

A sprocket wheel 106 is also keyed on the transaxle shaft 96 for rotation therewith. The sprocket wheel 106 is connected by a driving chain 108 carried within the transaxle housing 90 to a rear sprocket wheel 110 coupled to a differential assembly 116, which is also mounted within the transaxle housing 90. The rear sprocket wheel 110 is coupled through the differential assembly by conventional differential gearing (not shown) to a pair of rear axles 112 and 118 for the vehicle which are respectively carried in bearings 114 and 120. Each of the rear axles 112 and 118 is connected to one of the rear wheels 18 such that rotational motion is coupled through the sprocket wheel 110 and differential assembly 116 to the vehicle rear wheels 18. In this manner, when the driving dog 100 is situated for engagement with one of the side bevel gears 94 for driving of the transaxle shaft 96, the rear axles 112 and 118 are driven in the same rotational directions to drive the rear wheels 18 of the vehicle. Accordingly, forward or reverse driving speeds are available throughout the range of drive ratios of the variable speed sheave assembly 36.

Brake apparatus is also provided for the vehicle, and is shown in FIGS. 2 and 9. As shown, a braking disk 122 is fixed on the transaxle shaft 96 for rotation therewith. The brake disk 122 is disposed between a pair of self-releasing brake pads 124 which are operated by a brake arm 126, all in a well-known manner. The brake arm 126 is connected to one end of a forwardly extending brake link 128, which has its other end connected to a crank arm 130 at the front of the vehicle. The crank arm 130 is coupled to a brake rockshaft 132 which is connected to the vehicle frame in any suitable manner (not shown) for rotation about the axis shown by the dotted line 79 in FIG. 2. The laterally outer end of the rockshaft 132 has the brake pedal 26 mounted thereon.

The braking apparatus is controlled by the vehicle operator. When the brake pedal 26 is pushed forwardly and downwardly, the brake line 128 is pulled forwardly to turn the brake arm 126. This causes the brake pads 124 to engage the brake disk 122 and thereby stop the vehicle. Importantly, a tension loaded spring 134 interconnects the brake crank arm 130 with the vehicle frame to urge the brake pedal 26 rearwardly as shown in FIG. 2 to a non-operative position.

I claim:

1. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; first means including a bell crank having a pivot, a first arm carrying said sheave assembly and a second arm; means for shifting the position of said sheave assembly with respect to said driving and driven pulleys for altering the drive ratio of said sheave assembly through a range of low to high speed operating positions; means for attaching the shifting means to the second arm; second means pivotally connected to the bell crank pivot and the frame and means for biasing said sheave assembly generally away from said driving and driven pulleys to maintain said first and second belts under driving tension and for variably controlling the magnitude of driving tension forces on said first and second belts in accordance with operating speed.

2. A variable speed drive as set forth in claim 1 wherein said shifting means comprises a control linkage connected to said bell crank and manually operable for moving said bell crank with respect to said frame for shifting the position of said sheave assembly with respect to said driving and driven pulleys.

3. A variable speed drive as set forth in claim 1 wherein said second means comprises a pivot arm having opposite ends and pivotally connected to said bell crank at one end, to said frame intermediate said ends, and a spring connected between said pivot arm and said frame at the other of said ends.

4. A variable speed drive as set forth in claim 1 wherein said bell crank is formed to provide a housing for said sheave assembly and said shifting means comprises a control linkage connected to the second end thereof.

5. A variable speed drive as set forth in claim 1 wherein said second means includes a pivot arm having opposite ends and pivotally connected to said frame between its opposite ends, and said biasing means comprises a spring connected to one end of said pivot arm, said bell crank being connected to the opposite end of said pivot arm.

6. A variable speed drive as set forth in claim 2 wherein said control linkage comprises a control link pivotally connected to said bell crank, a crank arm connected to said control link opposite said bell crank, and a rockshaft mounted on said frame and connected to said crank arm, said rockshaft being movable about a fixed axis with respect to said frame for shifting the position of said bell crank with respect to said frame.

7. A variable speed drive as set forth in claim 6 wherein said bell crank is movable to shift said sheave assembly between a stopped position and said range of low to high speed operating positions, and including dead man control means for biasing said sheave assembly toward said stopped position.

8. A variable speed drive as set forth in claim 7 wherein said dead man control means comprises a spring.

9. A variable speed drive as set forth in claim 7 wherein said dead man control means is connected to said control linkage.

10. A variable speed drive as set forth in claim 1 wherein said first means is operable to shift said sheave assembly between a stopped position and said range of low to high speed operating positions, and including dead man control means for biasing said sheave assembly toward said stopped position.

11. A variable speed drive as set forth in claim 10 wherein said dead man control means comprises a spring.

12. A variable speed drive as set forth in claim 1 wherein said shifting means includes a control linkage for pivotally moving said bell crank from a stopped position with said first and second belts drivingly disengaged to a low speed operating position wherein said first and second belts drivingly engage the sheave assembly and their respective pulleys substantially simultaneously, and further toward progressively higher speed operating positions.

13. A variable speed drive as set forth in claim 1 including a combination transmission-differential assembly mounted on said frame and connected to at least one axle, said driven pulley being connected to said combination transmission-differential assembly to impart rotational motion of said driven pulley to said one axle.

14. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; a bell crank including a pivot movably mounted with respect to said frame a first arm carrying said sheave assembly and a second arm; a control linkage pivotally connected to said second arm for moving said bell crank with respect to said frame to shift the position of said sheave assembly with respect to said driving and driven pulleys to alter the drive ratio of the sheave assembly between a stopped position and a range of low to high speed operating positions; means including an arm pivotally connected to the bell crank pivot and to the frame; and means for biasing said sheave assembly generally away from said driving and driven pulleys to maintain said first and second belts under driving tension and for variably controlling the magnitude of driving tension forces on said first and second belts in accordance with operating speed.

15. A variable speed drive as set forth in claim 14 wherein said biasing means comprises a spring connected between said pivot arm and said frame.

16. A variable speed drive as set forth in claim 14 including dead man control means for biasing said sheave assembly toward said stopped position.

17. A variable speed drive as set forth in claim 16 wherein said dead man control means comprises a spring connected between said control linkage and said frame.

18. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; a bell crank having a pivot and a first arm with said sheave assembly mounted at one end thereof; a pivot arm having opposite ends with one end pivotally connected to the pivot of said bell crank, said pivot arm being pivotally connected to said frame; said bell crank including a second arm; a control linkage connected to the second arm of said bell crank and operable to shift the position of said sheave assembly with respect to said driving and driven pulleys to alter the drive ratio of the sheave assembly between a stopped position and a range of low to high speed operating positions; and means for biasing said sheave assembly generally away from said driving and driven pulleys to maintain said first and second belts under driving tension and for variably controlling the magnitude of driving tension forces on said first and second belts in accordance with increases in operating speed.

19. A variable speed drive as set forth in claim 18 wherein said biasing means comprises a spring connected between said pivot arm and said frame.

20. A variable speed drive as set forth in claim 18 including dead man control means for biasing said sheave assembly toward said stopped position.

21. A variable speed drive as set forth in claim 20 wherein said dead man control means comprises a spring connected between said control linkage and said frame.

22. In a variable speed drive having a frame with a driving pulley, a driven pulley, and a double pulley variable speed sheave assembly respectively rotatably positioned with respect thereto, first and second belts respectively reeved about said driving pulley and sheave assembly and said driven pulley and sheave assembly, and first means carrying said sheave assembly for shifting the position of said sheave assembly with respect to said driving and driven pulleys for altering the drive ratio of said sheave assembly through a range of low to high speed operating positions, the improvement comprising a bell crank including a pivot, a first arm for rotatably mounting said sheave assembly, and a second arm, means for pivoting said bell crank, and for attaching the pivoting means to the second arm of the bell crank and an arm for pivotally supporting said bell crank, means for pivotally mounting the arm from said frame, and a spring for biasing said sheave assembly generally away from said driving and driven pulleys to maintain said first and second belts under driving tension varying in accordance with increases in operating speed.

23. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly a bell crank including a; first arm carrying said sheave assembly and a second arm, and a linkage connected to the second arm for shifting the position of said bell crank to move said sheave assembly with respect to said driving and driven pulleys for altering the drive ratio of said sheave assembly between a stopped position and a range of low to high speed operating positions; dead man control means for biasing said bell crank to move said sheave assembly toward said stopped position; and second means for biasing said bell crank to move said sheave assembly generally away from said driving and driven pulleys to maintain said first and second belts under driving tension and for variably controlling the magnitude of driving tension forces on said first and second belts in accordance with operating speed.

* * * * *

UNITED STATES PATENT OFFICE
CERTIFICATE OF CORRECTION

Patent No. 4,176,560  Dated December 4, 1979

Inventor(s) George C. Clarke

It is certified that error appears in the above-identified patent and that said Letters Patent are hereby corrected as shown below:

Column 1, line 31, change "Morover" to --Moreover--.

Column 2, line 68, change "out" to --on--.

Column 4, line 54, change "drive" to --driven--; line 59, change "drive" to --driven--.

Column 6, line 13, change "Operational" to --Operation--.

Column 7, line 25, change "of" to --on--.

Column 8, line 21, change "line" to --link--.

Column 11, line 6 (Claim 23), change "assembly a" to --assembly; a--; line 7 (Claim 23), change "a; first" to --a first--.

Signed and Sealed this

Sixth Day of May 1980

[SEAL]

Attest:

SIDNEY A. DIAMOND

Attesting Officer  Commissioner of Patents and Trademarks